(12) United States Patent
Chen

(10) Patent No.: US 10,360,552 B2
(45) Date of Patent: Jul. 23, 2019

(54) IMPLEMENTING METHOD OF MOBILE GROUP-BUYING SYSTEM

(71) Applicant: Yi-Chou Chen, Taipei (TW)

(72) Inventor: Yi-Chou Chen, Taipei (TW)

(73) Assignee: USA CANAL SOFTWARE CO., LTD., New Castle, DE (US)

( * ) Notice: Subject to any disclaimer, the term of this patent is extended or adjusted under 35 U.S.C. 154(b) by 603 days.

(21) Appl. No.: 14/837,601

(22) Filed: Aug. 27, 2015

(65) Prior Publication Data

US 2016/0239822 A1 Aug. 18, 2016

(30) Foreign Application Priority Data

Feb. 16, 2015 (TW) .............................. 104105300 A (51) Int. Cl.
| | | |
|---|---|---|
| G06Q 20/10 | (2012.01) | |
| G06Q 20/04 | (2012.01) | |
| G06Q 20/32 | (2012.01) | |
| G06Q 30/06 | (2012.01) | |

(52) U.S. Cl.
CPC ......... G06Q 20/322 (2013.01); G06Q 20/102 (2013.01); G06Q 30/06 (2013.01)

(58) Field of Classification Search
CPC ....... G06Q 20/10; G06Q 20/322; G06Q 20/04
USPC ......................................................... 705/39
See application file for complete search history.

(56) References Cited

U.S. PATENT DOCUMENTS

| | | | | |
|---|---|---|---|---|
| 2001/0049636 A1* | 12/2001 | Hudda | .................. | G06Q 30/06 |
| | | | | 705/26.1 |
| 2012/0179516 A1* | 7/2012 | Fakhrai | .............. | G06Q 30/0207 |
| | | | | 705/14.1 |
| 2013/0013438 A1* | 1/2013 | Chen | ................... | H04L 61/1594 |
| | | | | 705/26.2 |
| 2013/0132220 A1* | 5/2013 | Baum | .................... | G06Q 30/02 |
| | | | | 705/26.1 |

(Continued)

FOREIGN PATENT DOCUMENTS

| | | |
|---|---|---|
| CN | 102880974 A | 1/2013 |
| TW | M359755 U | 6/2009 |
| TW | 201032161 A | 9/2010 |

(Continued)

*Primary Examiner* — Hai Tran
(74) *Attorney, Agent, or Firm* — Muncy, Geissler, Olds & Lowe, P.C.

(57) ABSTRACT

An implementing method of mobile group-buying system includes a buying group set-up step; a group-buying information creating step; a group-buying information transmitting step; and a group-buying information recording step. The mobile group-buying system is configured to allow at least two mobile communication devices to form a group-buying group, wherein each of the mobile communication devices is individually installed a group-buying APP. Further, initiator of each group-buying group can create group-buying information through the APP, and the group-buying information is issued to each participant of the buying group. Furthermore, when the buying group is established, the invitation of new attendants from any of the group participants to join the group of the same serial number is not accepted. Thus, the present disclosure not only can enhance participation rate of group-buying but also ensure the initiator and the participants in the buying group are in a first layer.

8 Claims, 12 Drawing Sheets

(56) References Cited

U.S. PATENT DOCUMENTS

2014/0188650 A1 7/2014 Sun et al.

FOREIGN PATENT DOCUMENTS

| TW | 201342273 A | 10/2013 |
| TW | I467508 B | 1/2015 |

* cited by examiner

| buying group serial number | buying group initiator | buying group participant |
|---|---|---|
| A-01 | 0981-123-123 | 0911-567-567<br>0916-541-134<br>0953-877-877<br>0929-145-741<br>... |
| A-02 | 0911-567-567 | 0937-412-543<br>0981-123-421<br>... |
| ... | ... | ... |

| device identification code | buying group initiator | buying group participant | group-buying commodity ever launched | group-buying commodity ever purchased |
|---|---|---|---|---|
| 0981-123-123 | Y | N | classic Nagasaki cake Pacific wild pomfret | ... |
| 0911-567-567 | Y | Y | mobile phone casing | classic Nagasaki cake power bank |
| ... | ... | ... | ... | ... |

| commodity serial number | commodity category | commodity name |
|---|---|---|
| P1 | C1 | selected frost steak |
| P2 | C2 | shock-absorption flexible type mobile phone casing |
| P3 | C1 | classic raw chocolate |
| P4 | C2 | mini flash drive |
| ... | ... | ... |

IMPLEMENTING METHOD OF MOBILE GROUP-BUYING SYSTEM

BACKGROUND OF INVENTION

Field of the Invention

The present invention relates to an implementing method of mobile group-buying system, more particularly to an implementing method of mobile group-buying system in which a number of consumers conduct group-buying through a group-buying APPs of mobile communication devices.

Brief Description of Prior Art

Development of information networks has triggered increasingly booming on the development of e-commerce. A variety of internet shopping business models are introduced one by one for consumers to purchase a variety of goods on internet, on which the websites offering group-buying (in short, group-buying website) is dazzling, such as Gomaji group-buying website and 17 life group-buying website etc. By collecting sufficient number of consumers through the group-buying website, purchase or use of commodity, coupon or service of a third-party company at preferential price can be obtained. As seller can puerile and buyer can get concessions and money saving, the business model of group-buying has considerable growth prospect. For example, both Taiwanese Patent Gazette No. 201032161 entitled "Internet Group-Buying Platform and Group-Buying Method" and another Taiwanese Utility Model Patent Gazette No. M359755 entitled "Internet Group-Buying Platform" disclose that sponsor of a buying group can click on merchant geographical data, merchant commodity data and commodity marketing materials displayed on the souk website through the operation on host machine, a link page is generated after selecting a commodity of a merchant and the link page is transmitted to another participants of the buying group for purchasing commodity. However, the way of conventional group-buying platform requires that the operator of group-buying platform actively searches commodities himself and coordinates with merchant side to release commodities for possible group-buying and to publish on the group-buying website for sponsor of group-buying to choose. However, consumers cannot but to accept making choice on the group-buying platform in most cases, and are unable to choose the things they want. Therefore, group-buying systems more in line with customer's need have been proposed, such as a Taiwanese Patent Gazette No. 201342273 entitled "Group-Buying System and Its Purchase Method" discloses that a group-buying platform allowing multiple users to login is provided and the data of a specific commodity in the group-buying platform, including threshold value of the number of participants in group and price for group-buying, can be edited. When the number of participants exceeds the threshold value, the specific item of commodity can be purchased at the preset group-buying price. There are additional prior arts for reference as below.
(1) Taiwanese Patent Gazette No. 1467508 entitled "Network Group-Buying Method"
(2) China Patent Gazette No. CN102880974 entitled "A System for Transmitting Commodity Group-Buying Information to Users"
(3) US Patent Publication US20140188650 entitled "Mobile group-buying method, platform and machine readable medium"

It is learned from the above prior arts, although the conventional group-buying system enables group-buying sponsor to choose the item he wants for group-buying, however, selectable commodities for group-buying are still limited to that offered by the group-buying platform. In other words, consumers still fail to launch group-buying for specific commodity according to their preference. Furthermore, the existing systems still don't have the function of rendering group-buying information (including commodities and commercials) to a specific consumer in line with his favorite by analyzing his consuming records.

SUMMARY OF THE INVENTION

In view of the above problems, the inventor of the present invention proposes a better group-buying system based on his abundant experience in manufacturing and product development in relevant field and according to the research and analysis made on the existing systems. Therefore, the main object of the present invention is to provide a mobile group-buying system and its implementing method which allows users to launch a group-buying actively on a specific commodity and recommends appropriate items in line with his demand for group-buying according to the analysis result made on group-buying records.

In order to achieve above object, the mobile group-buying system of the present invention comprises a group-buying server and a plurality of mobile communication devices. The group-buying server has a group-buying information transceiving module and a group-buying information recording module. Further, the mobile communication devices are respectively connected to the group-buying server through internet. Furthermore, each of the mobile communication devices has a group-buying APP installed therein, the group-buying APP has a buying group set-up module, a group-buying information creating module and a group-buying information transmitting module. The implementing method of the mobile group-buying system of the present invention is to form a buying group between at least two mobile communication devices through a device identification code of the mobile communication device after the buying group set-up module of the group-buying APP has been executed, wherein the inviter issuing the invitation of a buying group is an group-buying initiator (or a group sponsor), the people accepting the invitation of the buying group are group-buying participants (or group participant). The group sponsor can further execute the group-buying information creating module of the group-buying APP so that group-buying information is created and transmitted to the group-buying server and further is released to each of the participants of specific buying group through the group-buying information transmitting module of the group-buying APP, so as to conduct group buying. Additionally, the group-buying information recording module of the group-buying server will record group-buying behavior of each mobile communication device (i.e., each device identification code) and generates a group-buying record list.

BRIEF DESCRIPTION OF ACCOMPANYING DRAWINGS

The objects, the technical contents and the expected effect of the present invention will become more apparent from the detailed description of a preferred embodiment in conjunction with the accompanying drawings, in which.

DETAILED DESCRIPTION OF PREFERRED EMBODIMENTS

Figure 1:
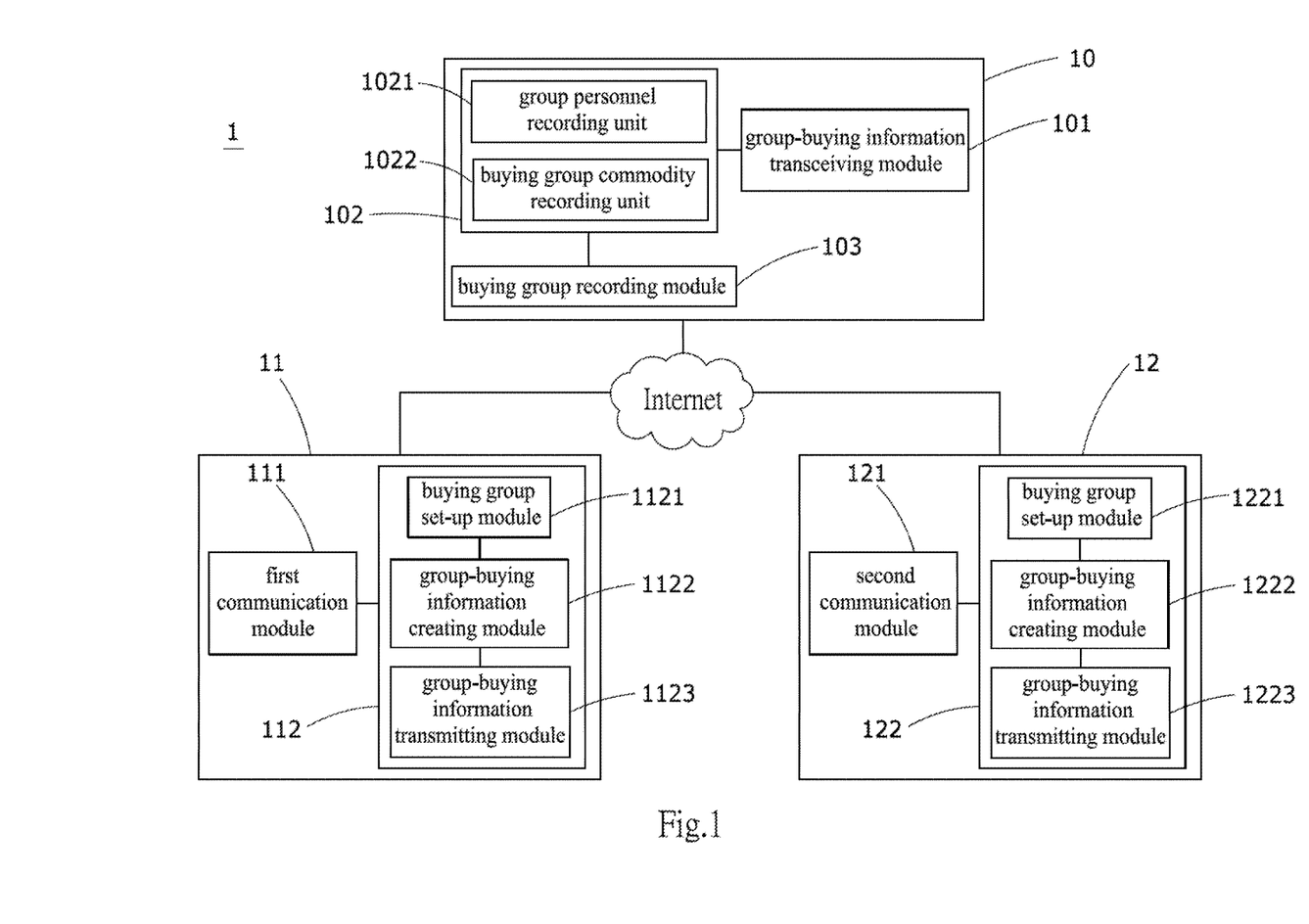
FIG. 1 is a block diagram showing the system structure of the present invention.

Firstly referring to FIG. 1, the mobile group-buying system 1 of the present invention comprises a group-buying server 10 and a plurality of mobile communication devices (i.e., a first mobile communication device 11 and a second mobile communication device 12). The group-buying server 10 has a group-buying information transceiving module 101, a group-buying information recording module 102 and a buying group recording module 103. The group-buying information recording module 102 and the buying group recording module 103 are connected to the group-buying information transceiving module 101 through internet. The group-buying information recording module 102 has a buying group personnel recording unit 1021 and a buying group commodity recording unit 1022. The group-buying information transceiving module 101 of the group-buying server 10 is used for transmitting and receiving group-buying information (not shown). The group-buying information recording module 102 is used for recording group-buying information, the buying group personnel recording unit 1021 of the group-buying information recording module 102 is used for recording the group personnel, and the buying group commodity recording module 1022 of the group-buying information recording module 102 is used for recording group-buying commodities. In other words, the group-buying information includes both the group personnel information and the group-buying commodities information. However, the present invention is not limited to this; any information required for completing the deals can be recorded by the group-buying information recording module 102. Furthermore, the first mobile communication device 11 and the second mobile communication device 12 respectively have a first communicating module 111 and a second communicating module 121 which can be connected to the group-buying server 10 through internet. Moreover, the first mobile communication device 11 and the second mobile communication device 12 respectively have a group-buying APP (112, 122) installed therein, each of the group-buying APP (112, 122) has a buying group set-up module (1121, 1221), a group-buying information creating module (1122, 1222) and a group-buying information transmitting module (1123, 1223).

Figure 2:
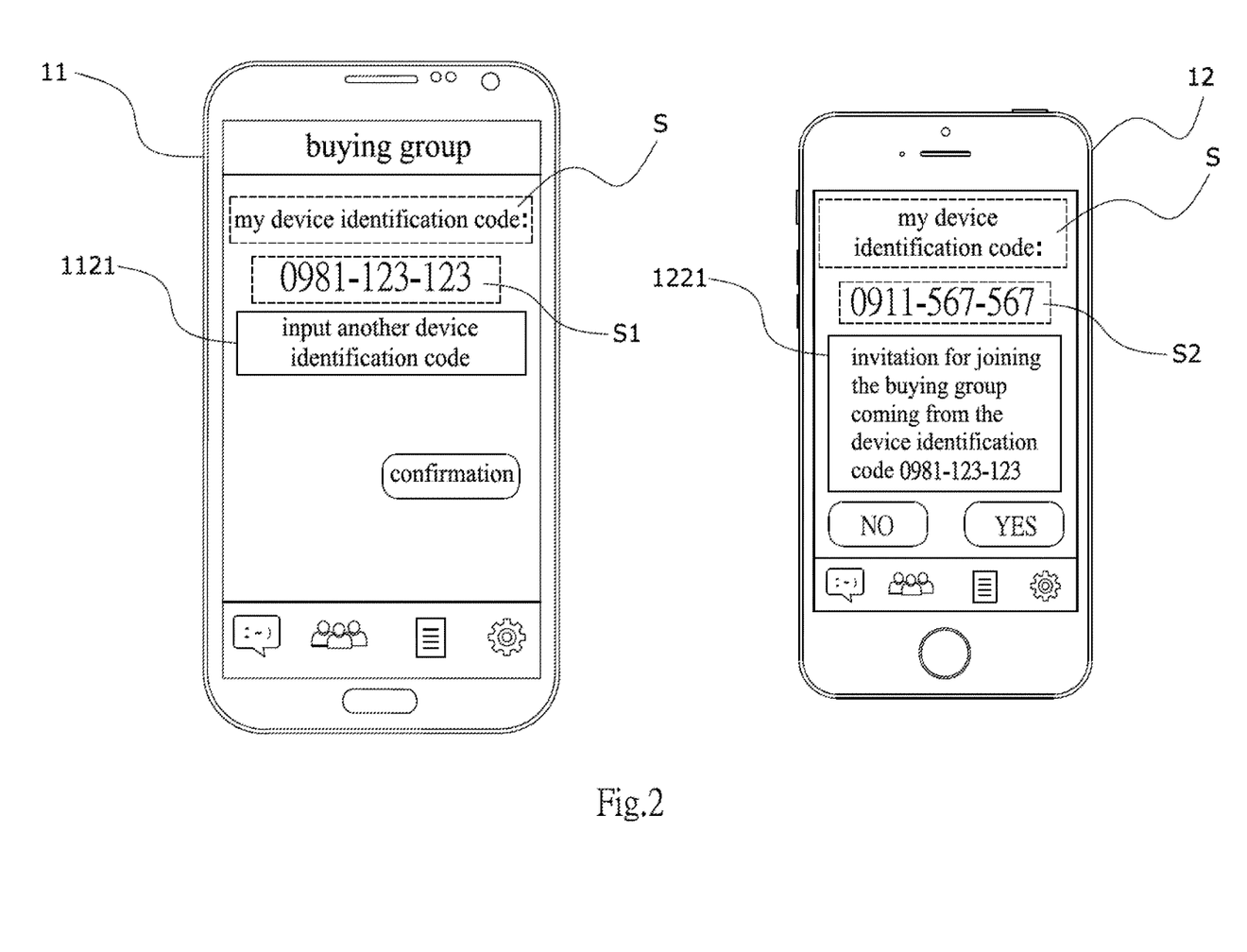
FIG. 2 is a schematic view (I) showing the set-up of buying group of the present invention.

Continuing from above and also referring to FIG. 2, each of the mobile communication devices of the present invention (i.e., the first mobile communication device 11 and the second mobile communication device 12) has a device identification code S, i.e., the first mobile communication device 11 has a first device identification code S1 and the second mobile communication device 12 has a second device identification code S2. The above device identification code S can be a mobile phone number, an international mobile equipment identity number (IMEI) or a self-defined account, however is not limited to these. When setting up a buying group, the first mobile communication device 11 executes the group-buying APP 112 and inputs the device identification code S of the other mobile communication device through the buying group set-up module 1121. For example, when the second device identification code S2 such as 0911-567-567 of the second mobile communication device 12 is inputted, the buying group set-up module 1221 of the group-buying APP 122 of the second mobile communication device 12 will receive the invitation coming from the buying group of the first mobile communication device 11 when executed. In the invitation information, the buying group set-up module 1221 of the group-buying APP 122 of the second mobile communication device 12 will show the first device identification code S1 of the first mobile communication device 11 for user's confirmation. When the second mobile communication device 12 accepts the invitation coming from the first mobile communication device 11, the first mobile communication device 11 and the second mobile communication device 12 will form a same buying group. Furthermore, the user issuing the invitation of the buying group (the first mobile communication device 11 herein) plays the role of the initiator of the group-buying, while the people accepting the invitation of buying group are the role of group participants.

Figure 3:
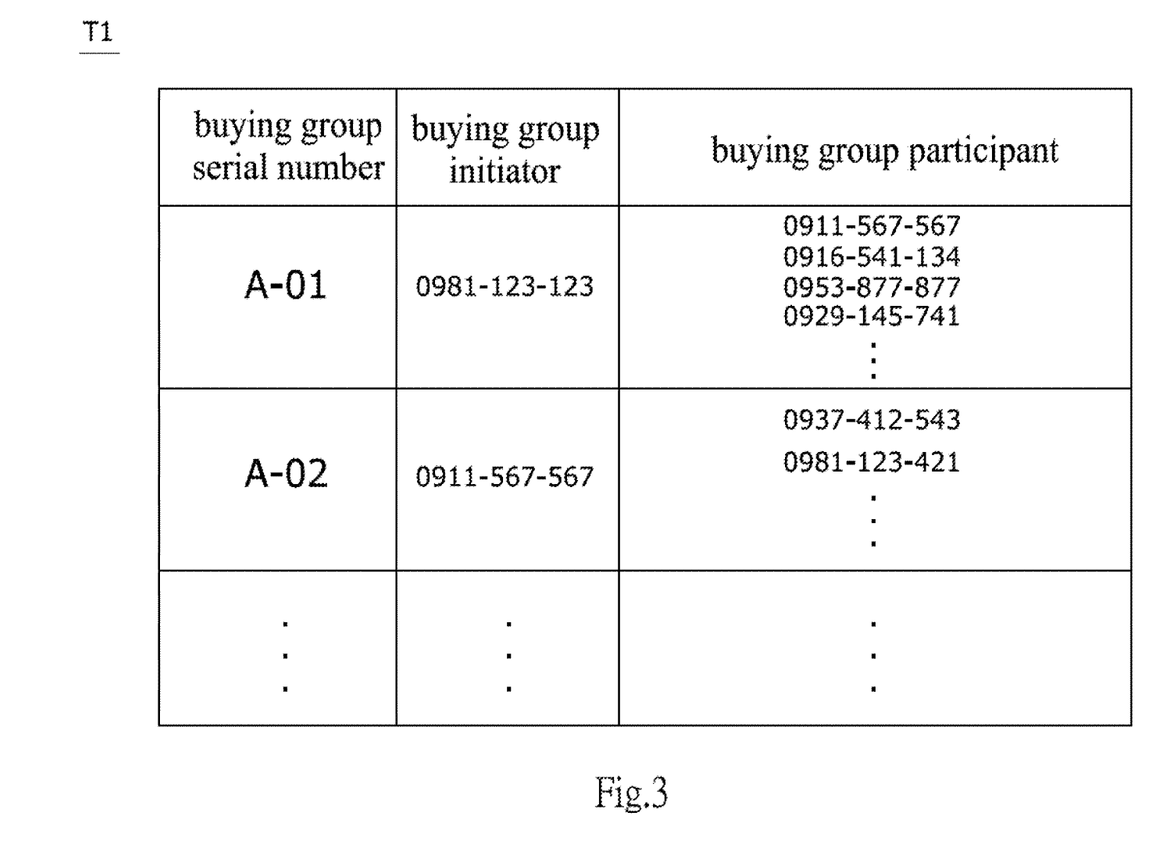
FIG. 3 is a schematic view (II) showing the set-up of buying group of the present invention.
Figure 4:
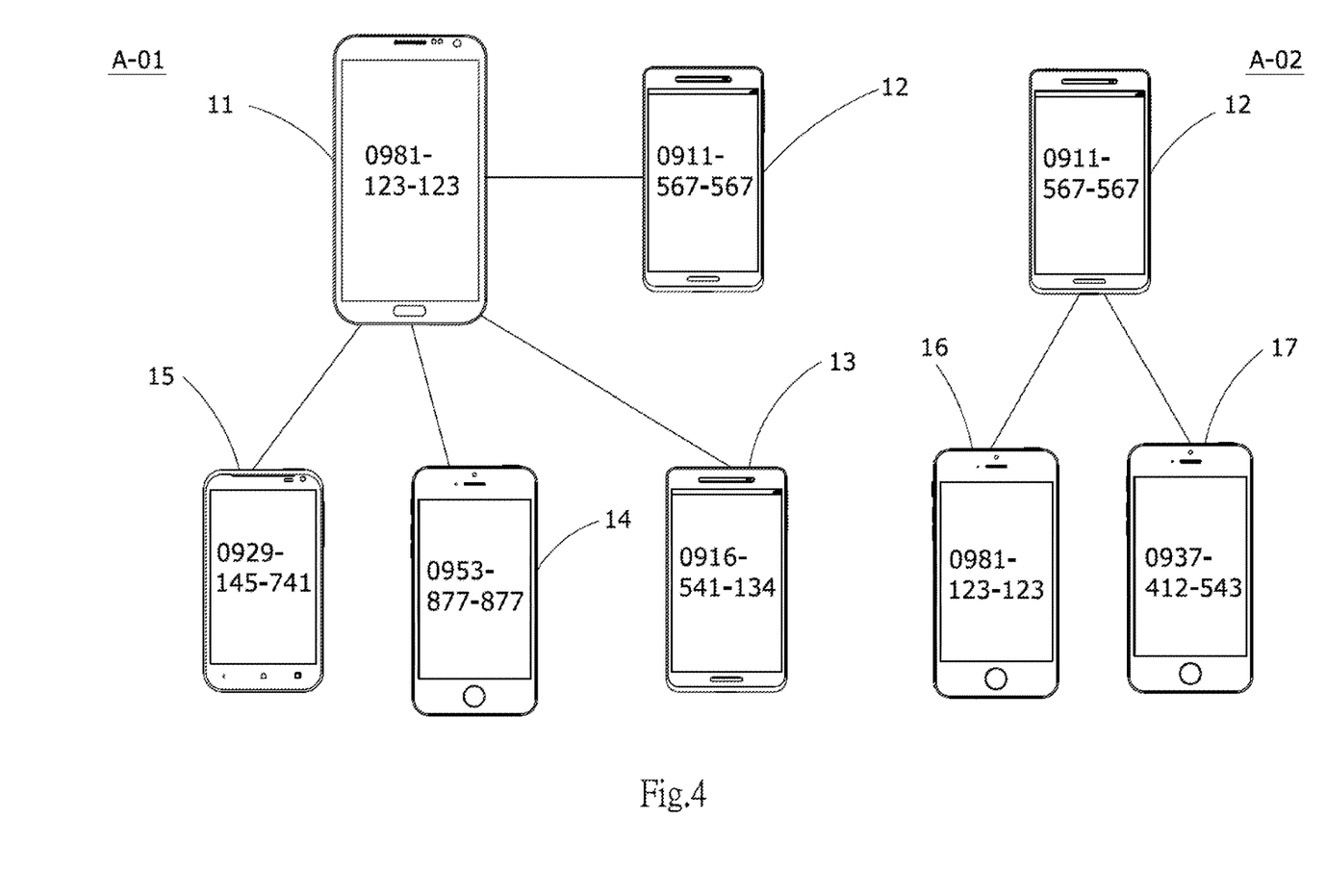
FIG. 4 is a schematic view (III) showing the set-up of buying group of the present invention.

Continuing from above and also referring to FIG. 3, when at least one buying group is formed, it is recorded by the buying group recording module 103 of the group-buying server 10 and a buying group list T1 is thus formed which includes the data of buying group serial number, buying group sponsor and group participants and the other data associated with the group, such as the group establishment date, enrollment date of each participant. Group serial number is numbered by the group recording module 103 according to the sequential order of set-up of buying group, for example A-01, A-02 . . . . However, numbering method is only an example and need not to be limited to this. The group sponsor and the group participants are indicated by their device identification code S, for example, the first mobile communication device 11 which issues the invitation of buying group is marked as the group sponsor by the first device identification code S1 (for example 0981-123-123), whereas another mobile communication devices (12, 13, 14, 15) (not shown) which accept the invitation of the buying group are indicated as group participants by their individual device identification code S (such as 0911-567-567, 0916-541-134, 0953-877-877, 0929-145-741). Referring further to FIG. 4, when a buying group of the present invention is established, it is preferred that invitation of new attendants from any of the group-buying participants (group participants) to join the group of the same serial number is not accepted. For example, the second mobile communication device 12 cannot issue an invitation of joining the group of serial number A-01 to the sixth mobile communication device 16. However, the second mobile communication device 12 (its device identification code S is 0911-567-567) still can be a role of an initiator of group-buying (i.e., a buying group sponsor) to issue an invitation from a buying group with serial number A-02 to the sixth and the seventh mobile communication devices (16,17). In other words, the 2$^{nd}$ to the 5$^{th}$ mobile communication devices (12, 13, 14, 15) in the same group of serial number A-01 are all invited by the 1$^{st}$ mobile communication device 11, whereas the 6$^{th}$ and the 7$^{th}$ mobile communication devices (16,17) in the same group of serial number A-02 are all invited by the 2$^{nd}$ mobile communication device 12. In this way, it can be ensured that the group sponsor and the group participants in the buying group are in a first layer relationship so as to maintain participation rate of group-buying. Therefore, the case of worse participation rate in conventional group-buying system due to permission of mass introduction of new comers into a buying group without acquaintance with the group sponsor can be improved.

Figure 5A:
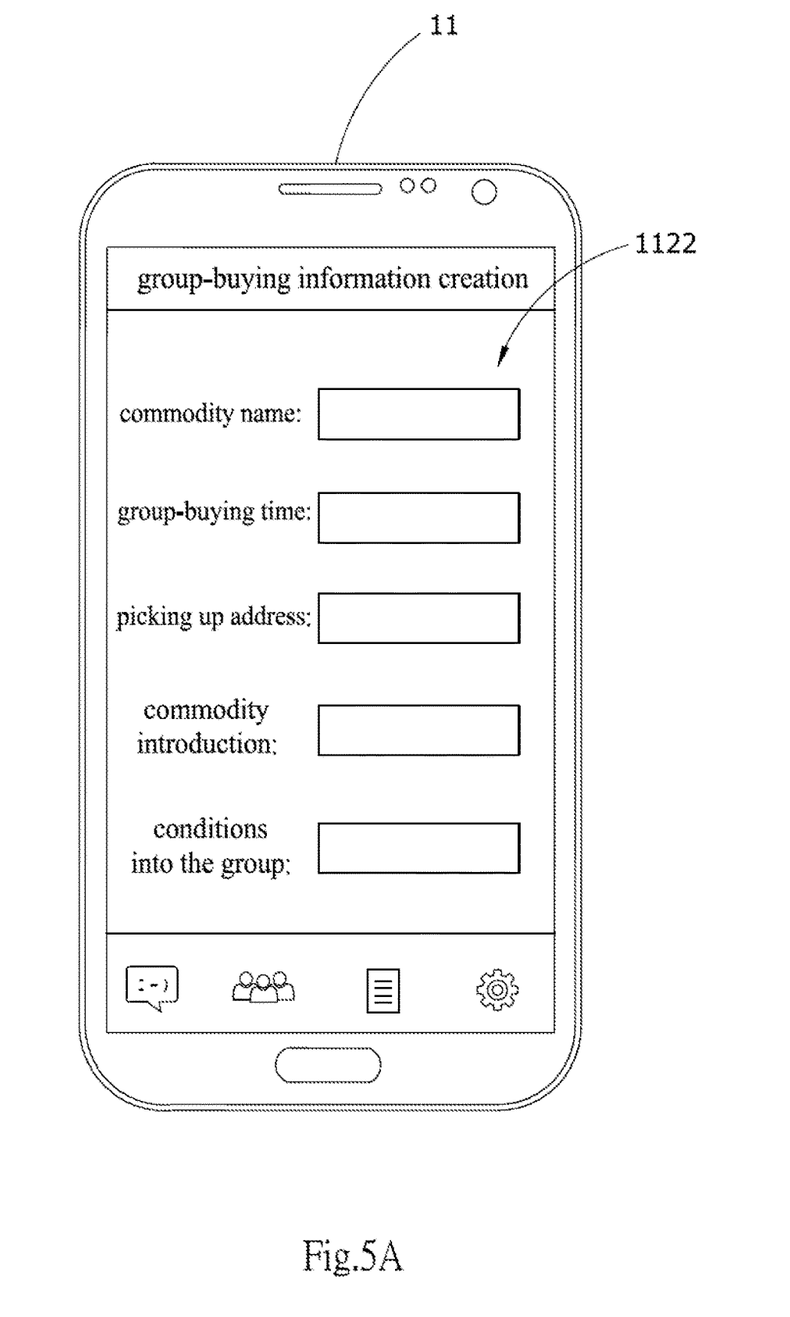
FIG. 5A is a schematic view (I) showing the creation of group-buying information of the present invention.
Figure 5B:
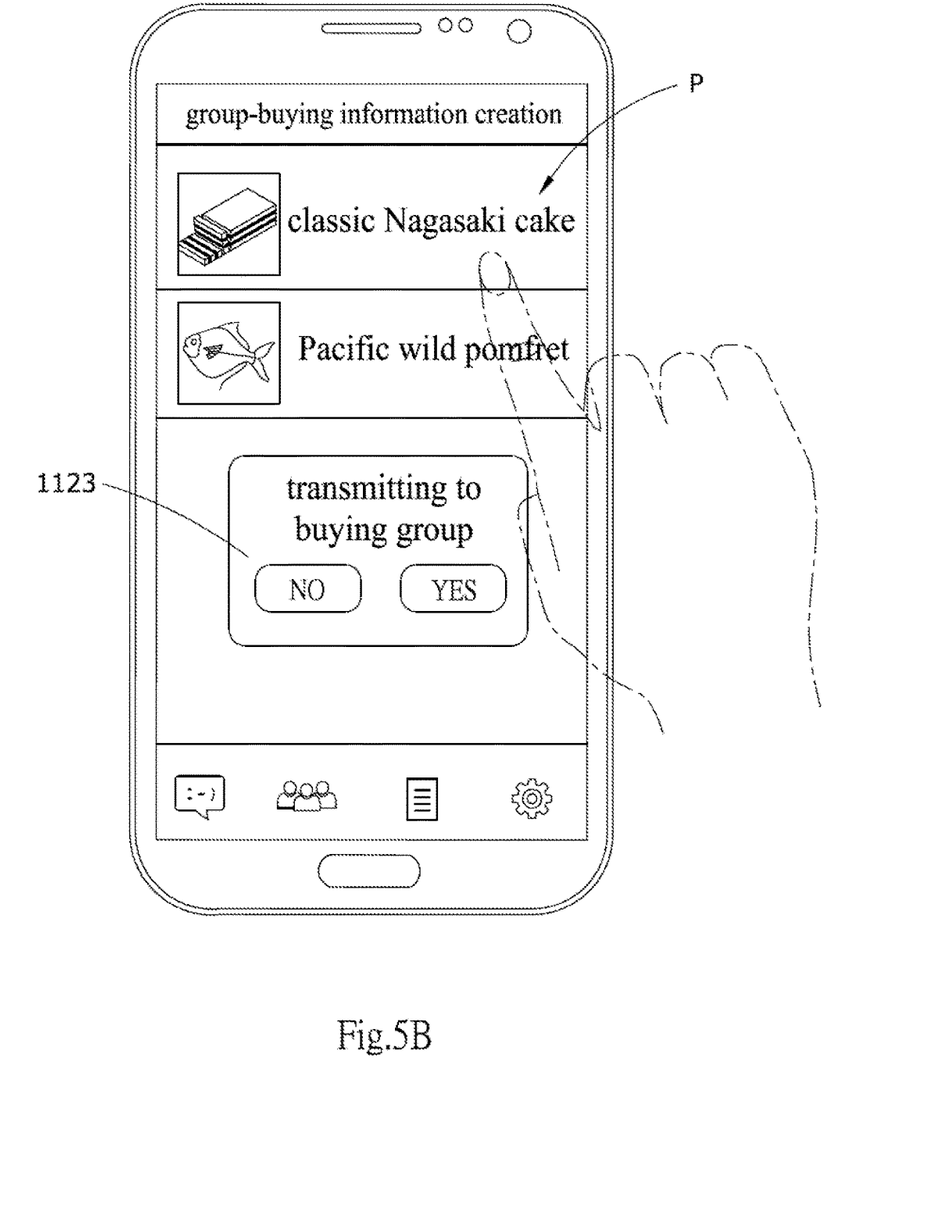
FIG. 5B is a schematic view (II) showing the creation of group-buying information of the present invention.

Continuing from above and also referring to FIG. 5A~5B, when a group sponsor knows a commodity and wants to launch group-buying, he can execute the group-buying information creating module 1122 of the group-buying APP 112 of the first mobile communication device 11 so as to create actively a group-buying information P concerning the target commodity he wants to launch a group-buying. The group-buying information P may include trade name, group-buying time, picking address, commodity introduction and condition into the group. Furthermore, information associated with group-buying commodity such as commodity price and commodity photo can also be incorporated. Moreover, a variety of kinds of commodity and commodity websites can also be included, but is not limited to these. The group-buying time is the deadline of the group-buying information P, while the condition into the group is the minimum condition the group-buying information P is established, such as requirement to reach a certain number of attendants or more. Further referring to FIG. 6, when the group-buying information P is accomplished, it is listed in the group-buying APP 112 of the first mobile communication device 11 (as shown in FIG. 5B), the group sponsor (i.e., the first mobile communication device 11) can select specific group-buying information P and send it to specific buying group by the group-buying information transmitting module 1123 of the group-buying APP 112. The group-buying information P will be sent to the group-buying server 10 and is sent to each group participant, i.e., the 2$^{nd}$ to the 5$^{th}$ mobile communication devices (12,13,14,15) of the buying group by the group-buying server 10 for group buying attendance. It is preferred that each group participant receiving the group-buying information P can also transfer the group-buying information P to his own buying group, for example, the second mobile communication device 12 can transfer the group-buying information P transmitted from the first mobile communication device 11 to his own buying group of serial number A-02 (as shown in FIG. 3). Further referring to FIG. 7, the group-buying information recording module 102 of the group-buying server 10 will record the group-buying behavior of each device identification code S, in which the group personnel recording unit 1021 of the group-buying information recording module 102 records whether each device identification code S is the group sponsor or group participant. For example, the device identification code S of 0981-123-123 is the sponsor of the buying group (marked by Y), but is not a group participant of the buying group (marked by N). Further, the group commodity recording unit 1022 of the group-buying information recording module 102 records the commodities launched or purchased by each device identification code S, such as the device identification code S of 0981-1223-123 has launched group-buying commodities named "classic Nagasaki cake" or "Pacific wild black pomfret". The information recorded by the group-buying information recording module 102 will generate a group-buying record list T2.

Figure 6:
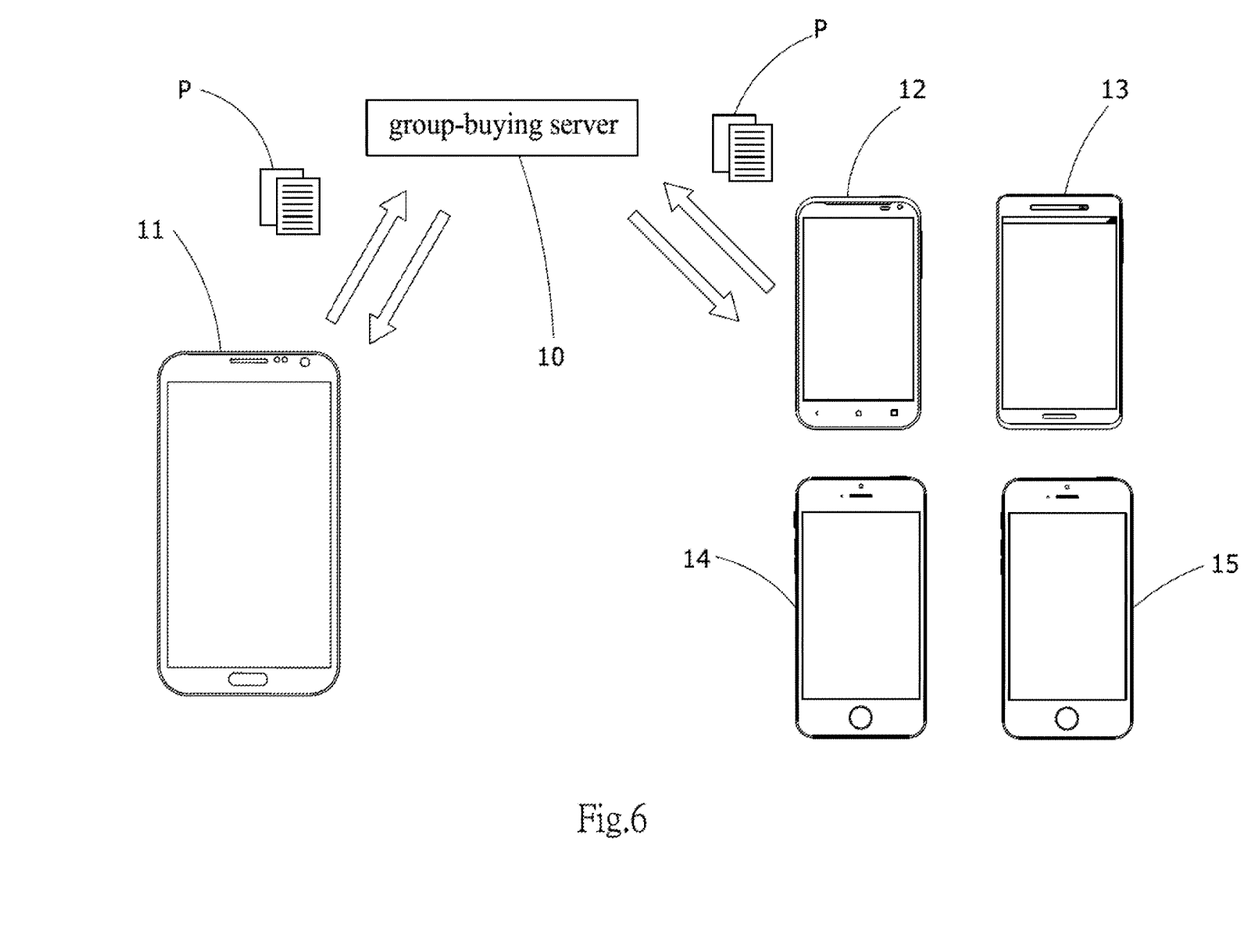
FIG. 6 is a schematic view showing the transmission of the group-buying information of the present invention.
Figure 7:
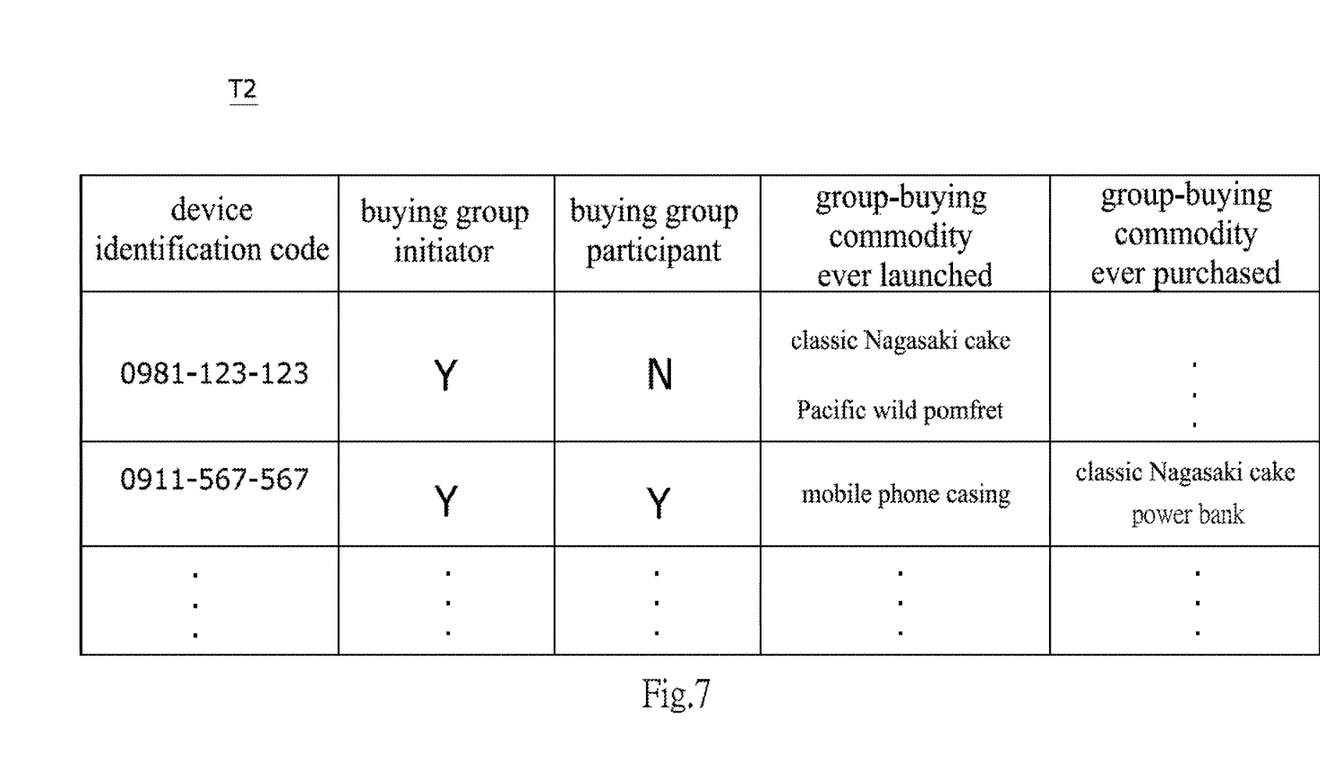
FIG. 7 is a schematic view of the group-buying record list of the present invention.
Figure 8:
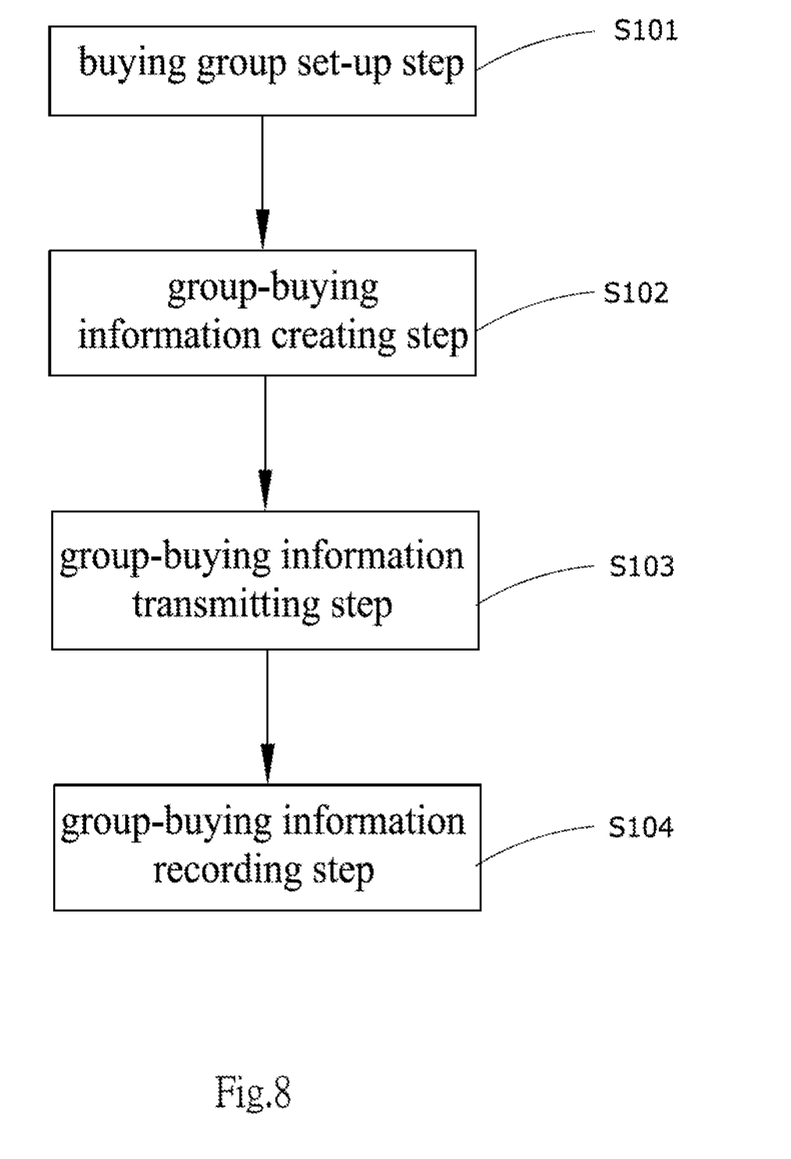
FIG. 8 is a schematic view of the implementing steps of the present invention.

Referring to FIG. 8 and simultaneously to FIG. 1, the implementing method of the mobile group-buying system of the present invention comprises the following steps:

a buying group set-up step S101: the first mobile communication device 11 having first device identification code S1 executes the group-buying APP 112, and sends an invitation of a group-buying through the group set-up module 1121 after inputting a second device identification code S2, so that a second mobile communication device 12 having the second device identification code S2, after accepting the invitation, accompanies the first mobile communication device 11 to form the members of the buying group. The first mobile communication device 11 issuing the invitation is the buying-group initiator (or group sponsor), whereas the second mobile communication device 12 accepting the invitation is the buying-group participant (group participant) (as shown in FIG. 3);

a group-buying information creating step S102: after the set-up of a buying group is finished, the group sponsor knows a commodity and wants to launch group-buying, he can create actively a group-buying information P concerning the target commodity he wants to launch a group-buying through the group-buying information creating module 1122 of the group-buying APP 112 of the first mobile communication device 11. The group-buying information P may include trade name, group-buying time, picking address, commodity introduction, condition into the group, commodity price, commodity photo, a variety of kinds of commodity choice and commodity websites, but is not limited to these (as shown in FIG. 5A). At least one group-buying information P may be listed in the group-buying APP 112 of the first mobile communication device 11 (as shown in FIG. 5B);

a group-buying information transmitting step S103: when the group-buying information P is accomplished, the group sponsor can select a specific group-buying information P and send it to a specific buying group by the group-buying information transmitting module 1123 of the group-buying APP 112 of the first mobile communication device 11. The group-buying information P will be sent to the group-buying server 10 and is sent to each group participant, i.e., the 2$^{nd}$ to the 5$^{th}$ mobile communication devices (12, 13, 14, 15) of the buying group by the group-buying server 10 for group buying attendance (as shown in FIG. 6);

a group-buying information recording step S104: the group-buying information recording module 102 of the group-buying server 10 will record the group-buying behavior of each device identification code S, in which the group personnel recording unit 1021 of the group-buying information recording module 102 records whether each device identification code S is the group sponsor or group participant, while the group commodity recording unit 1022 of the group-buying information recording module 102 records the commodities launched or purchased by each device identification code S. Finally, a group-buying record list T2 is generated (as show in FIG. 7).

Figure 9:
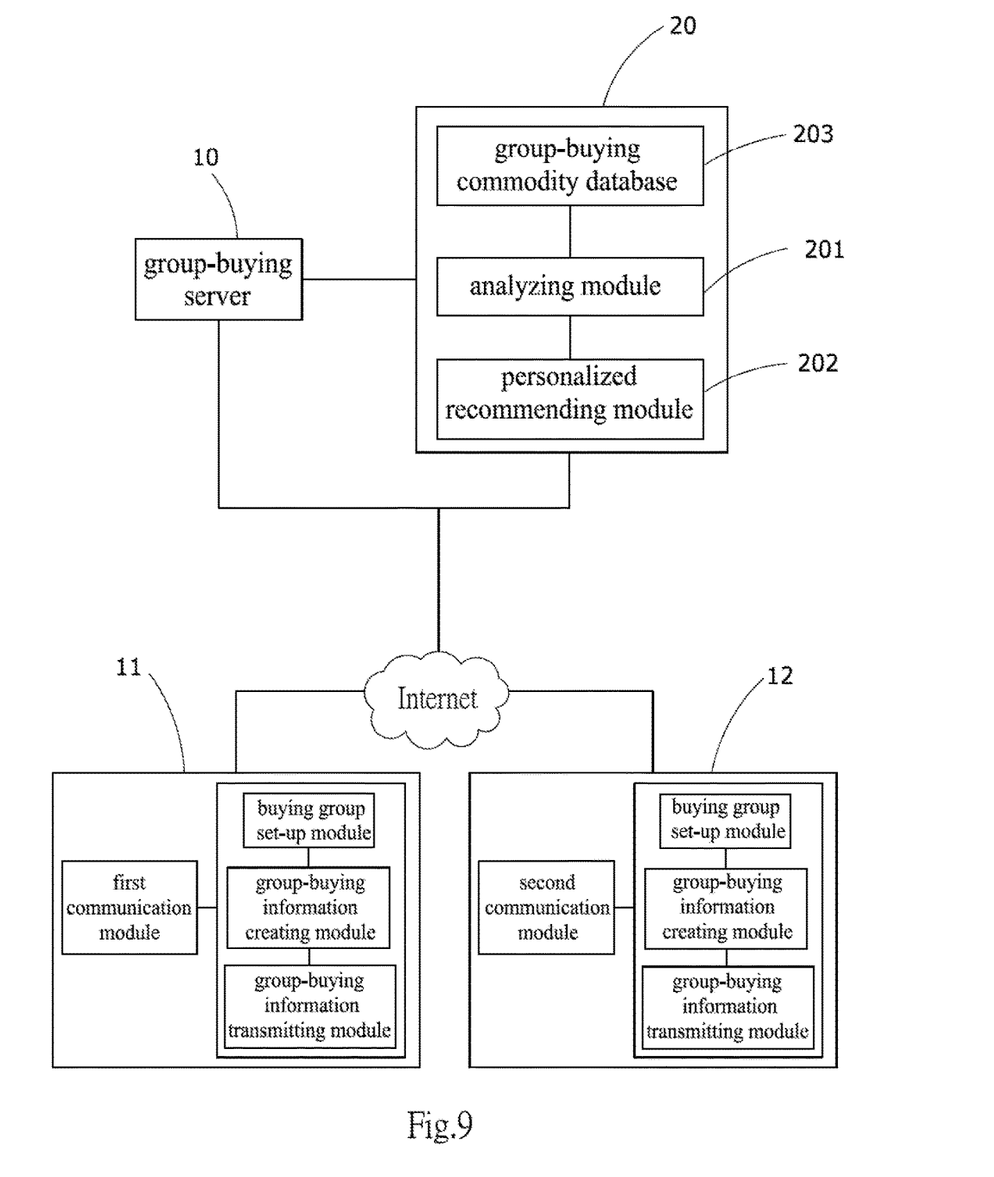
FIG. 9 is a block diagram of another structure of the system of the present invention.

Referring to FIG. 9, still another system of the present invention will be described. Simultaneously referring to FIGS. 1, 5A and 5B, the mobile group-buying system 1 of the present invention can further comprise a group-buying platform 20 which is connected to the group-buying server 10 and each of the mobile communication devices (11,12, . . . ) through internet. Furthermore, the group-buying platform 20 has an analyzing module 201, a personalized recommending module 202 and a group-buying commodity database 203. The group-buying commodity database 203 has at least one group-buying commodity (not shown) stored therein so as to be browsed by each of the mobile communication device (11,12, . . . ) through the execution of the group-buying APP (111,121, . . . ) and to be formed into the group-buying information P after direct selection through the group-buying information creating module (1122, 1222, . . . ). Simultaneously referring to FIG. 10, the group-buying commodity database 203 further has a commodity data list T3 stored therein which has commodity serial number, commodity category and commodity name of at least one group-buying commodity, but is not limited to these. Furthermore, the analyzing module 201 is provided for capturing the device identification code S of the mobile communication device connected to the group-buying platform 20, and fetches associated group-buying records at the group-buying record list T2 stored in the group-buying information recording module 102 of the group-buying server 10, and conducts the analysis and comparison between the fetched records and the commodity data list T3 so as to generate a personalized analysis result (not shown). For example, when the first mobile communication device 11 is connected to the group-buying platform 20, the analyzing module 201 will capture the first device identification code S1 of the first mobile communication device 11 and analyze the group-buying record list T2 within the group-buying server 10, such as to know that the first device identification code S1 has the record of launching group-buying of commodity entitled "Classic Nagasaki cake", "Pacific wild pomfret", and analyze the commodity data list T3 of the group-buying commodity database 203 which has group-buying of at least one commodity (for example, "selected frost steak" and "classic raw chocolate") of C1 (for example, food) category, so that a personalized analysis result of recommending commodity serial number P1 and commodity serial number P3 is generated. Therefore, the personalized recommending module 202 recommends the commodities having commodity serial number P1 and P3 in the group-buying commodity database 203 for the browsing of the first mobile communication device 11. In this manner, the present invention can provide group-buying commodity in line with the user's preference according to the analysis on his historical group-buying records.

Figure 10:
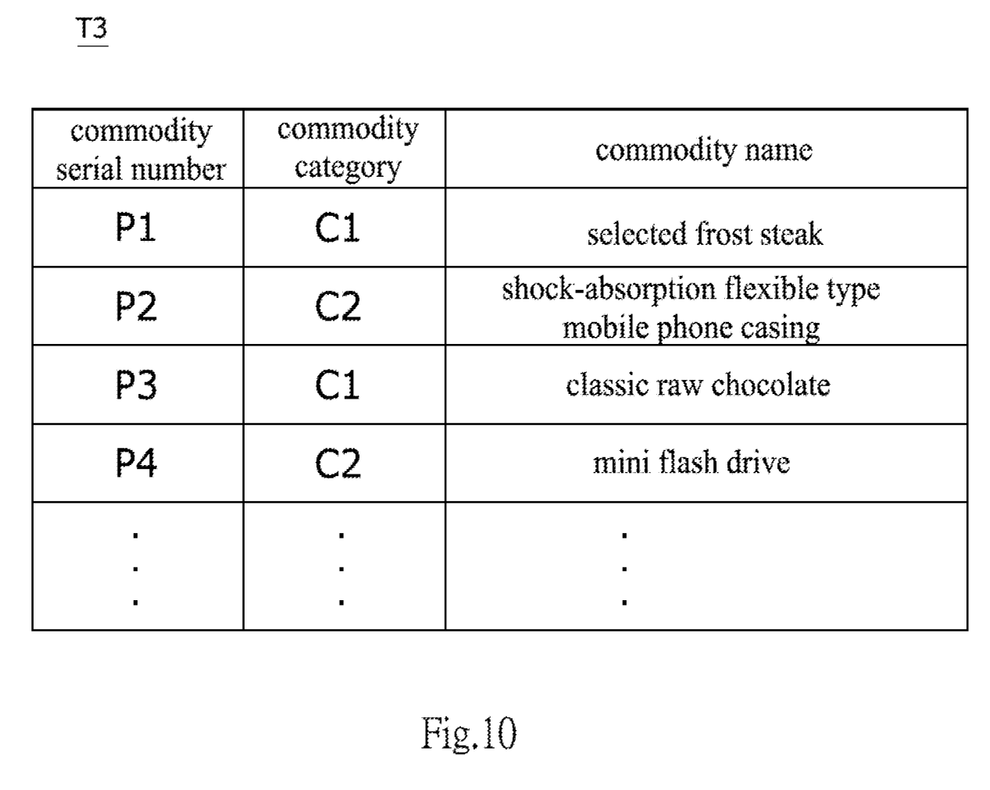
FIG. 10 is a schematic view of a commodity data list of the present invention.
Figure 11:
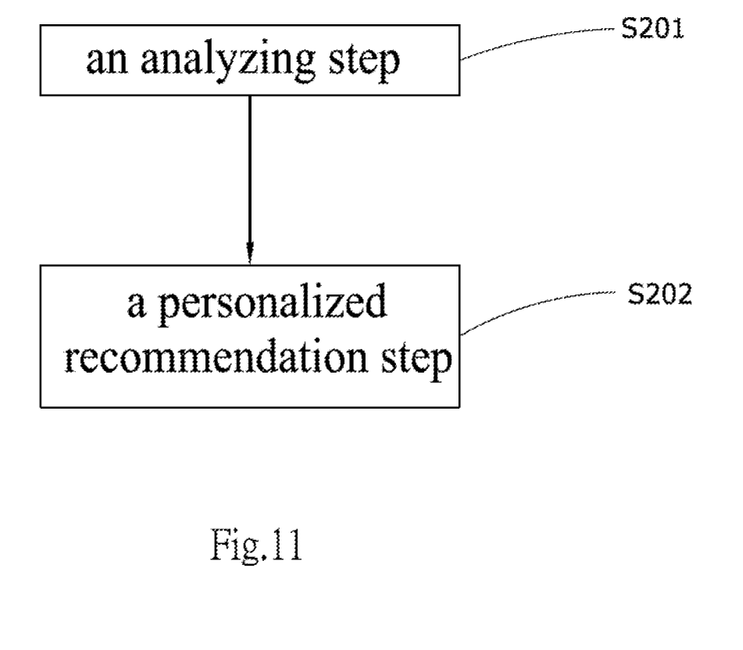
FIG. 11 is a schematic view of another implementing step of the present invention.

Referring to FIG. 11 and simultaneously to FIGS. 1 and 10, the implementing method of the mobile group-buying system of the present invention also comprises the following steps:

an analyzing step S201: after the first mobile communication device 11 is connected to a group-buying platform 20, the analyzing module 201 of the group-buying platform 20 will capture the first device identification code S1 of the first mobile communication device 11, and analyze a group-buying record list T2 owned by the group-buying server 10. Simultaneously, the analyzing module 201 will also analyze a commodity data list T3 of the group-buying commodity database 203 of the group-buying platform 20 so as to generate a personalized analysis result;

a personalized recommendation step S202: after analysis is finished, the personalized recommending module 202 of the group-buying platform 20, according to the personalized analysis result made by the analyzing module 201, recommends the commodities stored in the group-buying commodity database 203 for the browsing by the first mobile communication device 11.

It is apparent from the above descriptions, the mobile group-buying system of the present invention comprises a group-buying server, a group-buying platform and a plurality of mobile communication devices. The group-buying server has a group-buying information transceiving module and a group-buying information recording module. The group-buying platform is connected to the group-buying server by internet, and has an analyzing module, a personalized recommending module and a group-buying commodity database. The group-buying commodity database has a commodity data list stored therein, and the commodity data list has at least one commodity for group-buying. Furthermore, each of the mobile communication devices is connected to the group-buying platform and the group-buying server through internet. Moreover, each of the mobile communication devices has a group-buying APP installed therein, and each of the group-buying APPs has a buying group set-up module, a group-buying information creating module and a group-buying information transmitting module. On the other hand, in the implementing method of the mobile group-buying system of the present invention, one buying group can be formed between at least two mobile communication devices by inputting a device identification code of a mobile communication device, after the group set-up module of the group-buying APP is executed, wherein the inviter issuing the invitation for a buying group is a group-buying initiator (or group sponsor), whereas the people accepting the invitation for group-buying are group-buying participant (or group participant). The group sponsor can further execute the group-buying information creating module of the group-buying APP so as to create a group-buying information concerning the target commodity he wants to launch a group-buying. The group-buying information may include trade name, group-buying time, picking address, commodity introduction and condition into the group. Furthermore, the finished group-buying information is transmitted to the group-buying server through the group-buying information transmitting module, so that the group-buying transceiving module can release the group-buying information to each group participant of a specific buying group so as to conduct group-buying. Furthermore, the group-buying information recording module of the group-buying server will record group-buying behavior of each mobile communication device (each device identification code) so as to generate a group-buying record list. Furthermore, after the mobile communication device is connected to the group-buying platform, the analyzing module can capture the device identification code of the mobile communication device, and analyze the group-buying record list of the group-buying server. Simultaneously, the analyzing module can conduct analysis and comparison between the group-buying records and the commodity data list of the group-buying commodity database so as to generate a personalized analysis result.

The personalized recommending module of the group-buying platform recommends the commodities according to the personalized analysis result for personalized browsing of the mobile communication devices. In this manner, the present invention, after implementation according to the abovementioned, surely can provide a mobile group-buying system and its implementing method which allows users to launch a group-buying actively on a specific commodity and recommends appropriate item in line with his demand for group-buying according to the analysis result made on group-buying records.

While the preferred embodiment has been described and illustrated in conjunction with the accompanying drawings, it should be understood that the embodiment is merely for descriptive purpose, not intended for restriction of the scope of the present invention. Equivalent variations and modifications made by the person skilled in the art without departing from the spirit and scope of the present invention should be considered to be still within the scope of the present invention.

What is claimed is:

1. An implementing method of mobile group-buying system for enhancing participation rate of group-buying and for ensuring the sponsor and the participant in a buying group are in a first layer, the method comprising the following steps:
   a buying group set-up step: a first mobile communication device having a first device identification code executes a group-buying APP, and plays a role of an initiator to send an invitation of a group-buying through a group set-up module after inputting a second device identification code of a second mobile communication device, wherein said first device identification code is a self-defined account, and said group-buying APP of said second mobile communication device will show said self-defined account of said first mobile communication device for user's confirmation, after said second mobile communication device playing a role of a group participant accepts the invitation, said first mobile communication device forms a buying group with said second mobile communication device by said first group serial number via an internet, and after that a buying group list is thus formed by a group-buying server;
   a group-buying information creating step: after the set-up of a buying group is finished, said first mobile communication device creates a group-buying information by executing a group-buying information creating module of said group-buying APP, at least one said group-buying information is listed on said group-buying APP of said first mobile communication device;
   a group-buying information transmitting step: after said group-buying information is accomplished, said first mobile communication device sends said group-buying information to said buying group and said group-buying server by a group-buying information transmitting module of the group-buying APP via said internet, so as to allow said second mobile communication device conducting group-buying;
   when said second mobile communication device being indicated as said group participant of said buying group with said first group serial number plays a role of another initiator to form a second buying group with a second group serial number and create another group-buying information by inputting a third device identification code of a third mobile communication device, wherein said buying group list includes the data of said group serial numbers, said device identification code of said initiators and said device identification code of said group participants, and said second mobile communication device being indicated as said group participant of said buying group with said first group serial number is not allowed to send said invitation of said buying group with said first group serial number by inputting said third device identification code of said third mobile communication device; and
   a group-buying information recording step: said group-buying server records if each of said device identification codes is said initiator or said group participant, wherein said information recorded by said group-buying server will generate a group-buying record list.

2. The implementing method of mobile group-buying system as claimed in claim 1, wherein said group-buying information recording step further comprises the following steps:
   a group-buying information recording module of said group-buying server will record the group-buying behavior of said first mobile communication device, and a group commodity recording unit of said group-buying information recording module records a commodity launched or purchased by said first mobile communication device, and said information recorded by said group-buying information recording module will be stored in said group-buying record list.

3. The implementing method of mobile group-buying system as claimed in claim 2, further comprises one step after the completion of said group-buying information recording step:
   an analyzing step: said first mobile communication device is connected to a group-buying platform, an analyzing module of said group-buying platform will capture said first device identification code of said first mobile communication device and analyze said group-buying record list of said group-buying server; simultaneously, said analyzing module also analyzes a commodity data list of a group-buying commodity database of said group-buying platform and generates a personalized analysis result.

4. The implementing method of mobile group-buying system as claimed in claim 3, further comprises one step after the completion of said analyzing step:
   a personalized recommendation step: after analysis is finished by said analyzing module of said group-buying platform, a personalized recommending module, according to said personalized analysis result, recommends at least one commodity stored in said group-buying commodity database for browsing by said first mobile communication device.

5. The implementing method of mobile group-buying system as claimed in claim 1, wherein said first mobile communication device plays a role of said initiator to send said invitation of said buying group with said first group serial number by inputting other device identification codes of other mobile communication devices.

6. The implementing method of mobile group-buying system as claimed in claim 1, wherein said second mobile communication device plays a role of said another initiator to send said invitation of said second buying group with said second group serial number by inputting other device identification codes of other mobile communication devices.

7. The implementing method of mobile group-buying system as claimed in claim 5, wherein, said group-buying information issued to said buying group with said first group serial number is the same as said group-buying information issued to said buying group with said second group serial number, wherein each of said mobile communication devices being indicated as said group participant of said buying group with said first group serial number is different from each of said mobile communication devices being indicated as said group participant of said buying group with said second group serial number.

8. The implementing method of mobile group-buying system as claimed in claim 6, wherein, said group-buying information issued to said buying group with said first group serial number is the same as said group-buying information issued to said buying group with said second group serial number, wherein each of said mobile communication devices being indicated as said group participant of said buying group with said first group serial number is different from each of said mobile communication devices being indicated as said group participant of said buying group with said second group serial number.

* * * * *